(No Model.)
F. E. KOHLER.
POST HOLE DIGGER.
No. 281,193. Patented July 10, 1883.
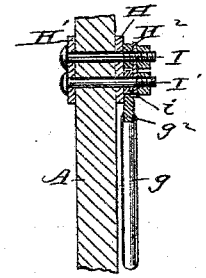
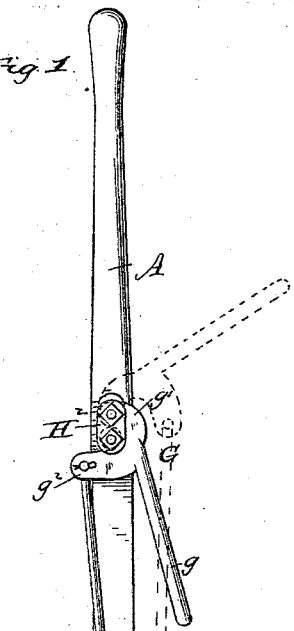
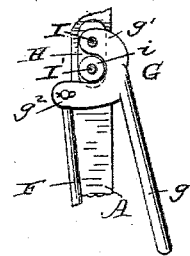
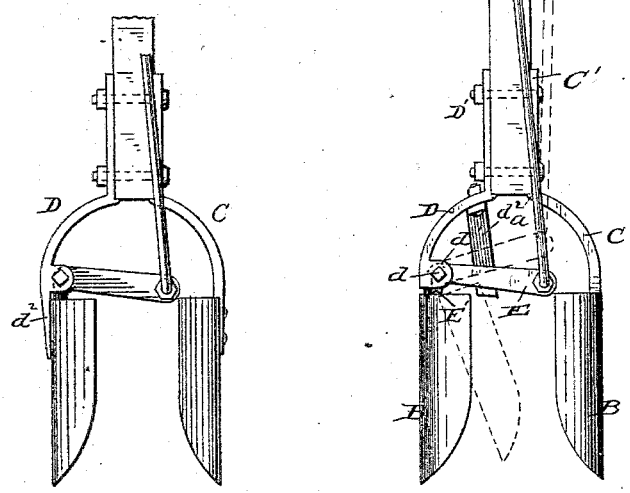
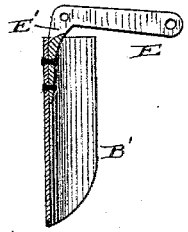
Witnesses
H. N. Low
L. H. Marshall
Inventor
Frederick E. Kohler
by Doubleday & Bliss.
attys

UNITED STATES PATENT OFFICE.

FREDERICK E. KOHLER, OF CANTON, OHIO, ASSIGNOR OF ONE-HALF TO ISAAC HARTER, OF SAME PLACE.

POST-HOLE DIGGER.

SPECIFICATION forming part of Letters Patent No. 281,193, dated July 10, 1883.

Application filed April 3, 1883. (No model.)

*To all whom it may concern:*

Be it known that I, FREDERICK E. KOHLER, a citizen of the United States, residing at Canton, in the county of Stark and State of Ohio, have invented certain new and useful Improvements in Post-Hole Diggers, of which the following is a specification, reference being had therein to the accompanying drawings.

Figure 1 is a side elevation of an implement embodying my improvements. Fig. 2 is a face view of the parts at the upper end of the link, one of the clamping-plates being removed. Fig. 3 is a vertical section. Fig. 4 shows a modification of the shovel-supports, and Fig. 5 is a section of the swinging shovel detached.

In the drawings, A represents the handle. It is situated centrally over the earth which is inclosed by the shovels. There are two of the latter, B B', situated oppositely to each other and being concavo-convex in form.

C represents a strong iron brace, which at the lower end is rigidly secured to the shovel B by rivets, welding, or in any other suitable way. At the upper end it is secured to or formed with a plate or bar, C', which is secured to the handle by through-bolts. The opposing shovel B' is hinged to an outwardly-curved arm, D, corresponding to that at C. The shovel, however, is not rigidly secured to the arm, but is pivoted thereto by means of a bolt, $d$, passing through ears $d'$ $d'$ projecting inwardly from the part D.

E E' represent a bent lever or arm, the part E' of which is fastened securely to the shovel B'. The pivot $d$ passes through it at the angle, the part E projecting across toward the other shovel, B.

F represents a link or rod loosely connected at its lower end to the arm E and at the upper end to a lever, G. The latter is formed with a handle portion, $g$, an arm, $g'$, by which it is pivoted to the handle A, and an arm, $g^2$, to which is pivoted the upper end of the link F. Between the lever G and the handle A there is arranged a plate, H, upon the opposite side of the handle a plate, H', and upon the outside of the lever a plate, H². Through these and through the handle pass two bolts, I I', the former providing the axis of the lever G and the latter supporting a spacing thimble or ferrule, $i$, the width of which is somewhat greater than that of the lever G, so that the latter shall have freedon to rock.

When the implement is to be used, the lever G is turned down until the shovel B' strikes against the stop $d^2$ on the arm D. When in this position the shovels are ready to be inserted into the ground, the swinging shovel B' being locked in its outermost position. The locking is effected by having the end of the arm $g^2$ swing across the line between the lower pivot of the link F and the pivot I. When the parts are in the last-described position, any tendency to swing the blade B' inward drives the arm $g^2$ upward against the under side of the ferrule $i$, which prevents it from moving upward, and therefore the said shovel B' is held firmly in a vertical position. After the shovels have been passed through or below a sufficient amount of earth, the latter is grasped between them by turning the lever G upward, as shown in dotted lines in Fig. 1, and this throws inward the lower part of the shovel B', it turning on the pivot $d$.

I am aware of the fact that a series of blades or spades have been hinged at the lower end of a hollow handle, and that with them have been combined devices for swinging the blades out and in and for locking them in their outermost position, and I do not broadly claim such device as my invention; but in the constructions heretofore used it has been necessary to use a hollow or grooved handle, as the hinged blades were moved out and in by means of a sliding grooved block, and it being necessary to hold said block on the operating-rod in proper position a guide was requisite, which guide was provided by grooving the handle or making it hollow. I avoid the large expense incident to a structure of this sort, and, moreover, provide an implement which is much stronger and simpler in structure, and one all of whose parts are readily accessible if detachment or repair is necessary.

I am also aware of the fact that a post-hole digger has been known having one vertically-arranged blade and another of the character of a scoop, which does not enter the ground until after the aforesaid vertical blade has been driven down, the blade and scoop being pivotally connected together, and the scoop having a hand-lever pivoted to the upright handle for forcing it down. In my construction the blades are in substantially similar positions when they are being inserted into the ground, and one being opposite to the other, the movement of the hinge blade not occurring until after they have inclosed the loosened earth, and therefore I can work loose the core of earth much more advantageously than can be done with diggers of the character above described.

The stop $d^2$ in the construction shown in Fig. 1 is provided by means of a support, $d'$, extending downward from the parts above, preferably being fastened to the curved brace D, though it may be attached at any suitable point. In Fig. 4 a stop performing substantially the same function is shown as being provided by a downward extension of the brace arm D and situated on the outside of the shovel.

When it is desired to have all of the parts arranged inside of the vertical planes of the shovel-blades they are arranged in a manner substantially similar to that in Fig. 1. Under many circumstances, however, a construction like that shown in Fig. 4 will not be disadvantageous, so far as this matter is concerned—to wit, the having of all of the parts inside of the vertical planes of the blades.

It will be readily seen that both of the blades or shovels B B' could be hinged to their respective arms by means of bell-crank levers, and that both of the levers could be operated by means of a single link, F, one of the lever-arms being slotted to allow the required play of the pivot.

The parts C C and D D' are each formed with an inward projection or offset, $a$, upon which the lower end of the handle rests. These are made strong enough to receive to advantage the force of the blow when the implement is being struck downward, they operating to relieve the bolts in the wood of much of the wear and straining which would act to loosen them.

By examining the drawings it will be seen that the lever E, the link F, and the lever G are so related and so situated relatively to the other parts that when the implement is being inserted the arm E is extended toward the rigid shovel, and the pivot which joins it to the part F is so far beyond the central vertical line of the handle that the lock is very firm, the end $g^2$ of the part G being also situated to the left of the central vertical line of the handle. In implements of this general class, as they have been heretofore made, the lock has depended upon a curved handle corresponding somewhat to the arm $g$ of the part herein generally lettered G. A curved handle of the character thus employed is disadvantageous, and a straight handle, like that at $g$, is much superior, as the leverage can be applied by the operator's hand at any part thereof, and especially can it be applied at great advantage at the very end of the part $g$. In my case the locking is effected entirely independently of the handle proper, G. My implement differs from those of this class heretofore used in another respect. Heretofore it has been common to combine with the swinging blade and the devices for moving it means at the upper end for so locking the blade as to prevent it from swinging inwardly, and also means at the upper end to prevent it from swinging outwardly. When the parts are thus arranged the blade is not held rigidly in position, as there is necessarily considerable looseness of the parts at the various joints, which allows the swinging blade to move outwardly to such an extent as to interfere with the proper operations of the two. On the contrary I, while employing a stop at the upper end to prevent the blade from swinging inwardly, apply a strong bracing-stop at the lower end to prevent the blade from swinging outwardly. Therefore I can bring said stop to bear where it is most needed—viz., in immediate proximity to the blade itself.

What I claim is—

1. In a post-hole digger, a solid central handle, a shovel rigidly fastened thereto, an opposing shovel pivotally connected to the handle and arranged to be horizontally opposed to the rigid shovel when they are being inserted, means for locking the swinging shovel in position while being inserted, and means for swinging the pivoted shovel toward the rigid shovel after being unlocked, substantially as set forth.

2. In a post-hole digger, a solid central handle, the downwardly and outwardly projecting arms C and D, both rigidly fastened to the central handle, the shovel B, rigidly fastened to the arm C, the opposing shovel B', connected to the other arm, D, by a pivot situated below the lower end of the central handle, A, and means connected with the swinging shovel and extending up to within reach of the operator's hands for swinging the shovel, substantially as set forth.

3. The combination of the central handle, A, the downwardly and outwardly projecting arms C and D, both rigidly connected with said handle, the shovel B, rigidly secured to the arm C, the opposing shovel B', the bent lever E E', rigidly attached to the shovel B' and connected to arm D by a pivot below the central handle, and means pivotally connected to said lever E E' and extending upwardly by the side of the handle to a point within reach of the operator for swinging the shovel B' out and in, substantially as set forth.

4. The combination of the central handle, a shovel rigidly connected to said handle and below it, an opposite shovel pivotally connected to the handle and situated below it, the vertically-reciprocating bar F outside of the handle A, and extending to a point below it, means for pivotally connecting said bar F with the shovel B', and means at the upper end of bar F for causing it to reciprocate vertically, substantially as set forth.

5. In a post-hole digger, the combination of a handle arranged centrally over the earth inclosed by the shovel, a shovel rigidly fastened thereto, an opposing shovel pivotally connected to the handle, a lever connected to the pivoted shovel, which lever extends toward the rigid shovel to a point beyond the central vertical line of the handle, and a link pivotally joined at its lower end to said lever, and when the pivoted shovel is locked extending from one side of the central line of the handle to the other, substantially as set forth.

6. In a post-hole digger, a swinging shovel, the lever G, a vertically-reciprocating bar, F, outside of the handle A, for operating the swinging shovel, the handle $g$, and mechanism for locking said shovel in a fixed position independently of the handle $g$, substantially as set forth.

7. In a post-hole digger, the combination of a shovel arranged to swing relatively to the handle, a vertically-reciprocating bar, F, outside of the handle, and connected with the swinging shovel, the lever G, pivotally connected to the vertically-reciprocating bar F, and a stationary stop, $i$, against which the lever G strikes when moving in one direction and locks it, substantially as set forth.

8. In a post-hole digger, the combination of the handle A, a shovel pivotally connected with said handle, mechanism extending up from the swinging shovel, outside of the handle, to a point within reach of the operator's hand for swinging said shovel, devices at the upper end of the shovel-swinging mechanism for locking it to prevent the shovel from swinging inwardly, and supplementary locking devices at the lower end having a stop or abutment in proximity to the swinging shovel to prevent said shovel from swinging outwardly while being inserted, substantially as set forth.

9. The combination of the handle, the shovel B, rigidly attached to the handle, the arm D, provided with a stop, the shovel B', arranged, substantially as set forth, to abut against said stop, the lever E E', pivotally connected to the arm D, the arm E of said lever extending across to the other side of said handle, the vertically-reciprocating link F outside of the handle, and means at the upper end of said link for causing its reciprocation, substantially as set forth.

In testimony whereof I affix my signature in presence of two witnesses.

FREDERICK E. KOHLER.

Witnesses:
  THEO. C. URAM,
  HARRY P. BALL.